US012361545B2

(12) United States Patent
Oldfather et al.

(10) Patent No.: US 12,361,545 B2
(45) Date of Patent: Jul. 15, 2025

(54) RAPID ON-SITE EVALUATION USING ARTIFICIAL INTELLIGENCE FOR LUNG CYTOPATHOLOGY

(71) Applicant: Veran Medical Technologies, Inc., St. Louis, MO (US)

(72) Inventors: Jayson Oldfather, Golden, CO (US); Mark Hunter, St. Louis, MO (US); Troy L. Holsing, Golden, CO (US); Torsten M. Lyon, Golden, CO (US)

(73) Assignee: Veran Medical Technologies, Inc., St. Louis, MO (US)

( * ) Notice: Subject to any disclaimer, the term of this patent is extended or adjusted under 35 U.S.C. 154(b) by 452 days.

(21) Appl. No.: 17/962,312

(22) Filed: Oct. 7, 2022

(65) Prior Publication Data
US 2023/0115733 A1     Apr. 13, 2023

Related U.S. Application Data

(60) Provisional application No. 63/253,911, filed on Oct. 8, 2021.

(51) Int. Cl.
| G06T 7/11 | (2017.01) |
| G06N 3/08 | (2023.01) |
| G06T 7/00 | (2017.01) |

(52) U.S. Cl.
CPC ............. *G06T 7/0012* (2013.01); *G06N 3/08* (2013.01); *G06T 7/11* (2017.01); *G06T 2200/24* (2013.01);
(Continued)

(58) Field of Classification Search
CPC ........ G06N 3/045; G06N 3/0464; G06N 3/08; G06N 3/09; G06N 3/096; G06T 2200/24;
(Continued)

(56) References Cited

U.S. PATENT DOCUMENTS

| 10,943,346 B2 * | 3/2021 | Wirch .................... G06T 3/147 |
| 2016/0235372 A1 * | 8/2016 | Schneider ............... G16Z 99/00 |

(Continued)

FOREIGN PATENT DOCUMENTS

WO     2023059919     4/2023

OTHER PUBLICATIONS

"International Application Serial No. PCT US2022 046119, International Search Report mailed Feb. 7, 2023", 2 pgs.
(Continued)

*Primary Examiner* — Tsung Yin Tsai
(74) *Attorney, Agent, or Firm* — Schwegman Lundberg & Woessner, P.A.

(57) ABSTRACT

A system and method are presented for applying convolutional neural networks (CNNs) to aid in rapid on-site evaluation cytopathology. Image data are acquired from a biopsy slide. Areas of interest are determined using a first CNN. The image data is segmented into image tiles, and tiles showing the areas of interest are analyzed using a second CNN to assign a histologic category to the slide. The second CNN also utilizes site specific data relating to the biopsy location. Layered image data from multiple focal planes can be acquired of the slide and used as input to the second CNN. Categorized tiles are sorted and presented to a remote computing system for cytopathology determinations, aided by the results of applying the second CNN. Semantic segmentation can also be developed, both as input to the second CNN and as data presented to the remote computer system.

20 Claims, 13 Drawing Sheets

(52) U.S. Cl.
CPC .............. *G06T 2207/10056* (2013.01); *G06T 2207/10148* (2013.01); *G06T 2207/20021* (2013.01); *G06T 2207/20081* (2013.01); *G06T 2207/20084* (2013.01); *G06T 2207/30064* (2013.01); *G06T 2207/30096* (2013.01)

(58) Field of Classification Search
CPC . G06T 2207/10056; G06T 2207/10148; G06T 2207/20021; G06T 2207/20081; G06T 2207/20084; G06T 2207/30024; G06T 2207/30064; G06T 2207/30096; G06T 7/0012; G06T 7/11
See application file for complete search history.

(56) References Cited

U.S. PATENT DOCUMENTS

| | | | |
|---|---|---|---|
| 2019/0206056 A1* | 7/2019 | Georgescu | G06T 7/0014 |
| 2020/0272864 A1 | 8/2020 | Faust et al. | |
| 2020/0364587 A1* | 11/2020 | Kapur | G16H 30/40 |
| 2021/0090250 A1* | 3/2021 | Soans | G06V 10/82 |
| 2021/0166785 A1 | 6/2021 | Yip et al. | |
| 2021/0366594 A1* | 11/2021 | Park | G06N 3/084 |

OTHER PUBLICATIONS

"International Application Serial No. PCT US2022 046119, Written Opinion mailed Feb. 7, 2023", 6 pgs.
"International Application Serial No. PCT US2022 046119, International Preliminary Report on Patentability mailed Apr. 18, 2024", 8 pgs.

* cited by examiner

Fig 1 -- WSI slide scan. 110,592 pixels wide by 53,248 pixels tall. 2.9 GB file size

Fig. 8a

| Slide | Appearance | Patch | AI Process Time | Benign Total | Suspicious Total | Lymphocyte Total | Macrophage Total | Neutrophil Total | Suspicious Regions |
|---|---|---|---|---|---|---|---|---|---|
| 1 | Dark Purple (Sparce) | 239616 | 441 | 1498 | 10673 | 152 | 322 | 518 | Abundant |
| 2 | Blue/Dark Purple Dense | 185856 | 342 | 12658 | 6358 | 1763 | 2964 | 2874 | Abundant |
| 3 | Dark Blue | 57600 | 106 | 104 | 1478 | 122 | 54 | 43 | Abundant |
| 4 | Dark Purple | 253184 | 466 | 37457 | 1229 | 7335 | 1910 | 485 | Abundant |
| 5 | Purple | 350208 | 644 | 1433 | 871 | 9627 | 3 | 2261 | Abundant |
| 6 | Dark Purple | 133120 | 245 | 1572 | 644 | 252 | 400 | 40 | Abundant |
| 7 | Dark Blue | 116736 | 215 | 4188 | 616 | 84 | 121 | 43 | Abundant |
| 8 | Dark Midnight Blue | 235520 | 433 | 87 | 536 | 76 | 75 | 85 | Abundant |
| 9 | Purple / Dense / Blue Dense | 101376 | 187 | 448 | 496 | 3274 | 578 | 130 | Abundant |
| 10 | Dark Purple | 300800 | 553 | 11343 | 493 | 7611 | 476 | 920 | Abundant |
| 11 | Dark Purple/Black Dense | 230400 | 424 | 8020 | 421 | 3157 | 351 | 562 | Abundant |
| 12 | Light Purple/Pink | 67584 | 124 | 2159 | 378 | 291 | 259 | 70 | Abundant |
| 13 | Dark Purple | 103168 | 190 | 4506 | 360 | 433 | 409 | 106 | Abundant |
| 14 | Maroon | 359423 | 661 | 10339 | 342 | 11272 | 327 | 3237 | Abundant |
| 15 | Dark Blue | 17408 | 32 | 14 | 235 | 15 | 11 | 5 | Abundant |
| 16 | Blue/Dark Purple | 175104 | 322 | 997 | 228 | 1234 | 81 | 134 | Abundant |
| 17 | Purple | 94208 | 173 | 423 | 209 | 358 | 294 | 77 | Abundant |
| 18 | Purple / Dense | 100097 | 184 | 8153 | 199 | 3365 | 632 | 792 | Moderate |
| 19 | Purple | 49920 | 92 | 662 | 176 | 3687 | 4 | 882 | Moderate |
| 20 | Light Baby Blue | 72960 | 134 | 332 | 175 | 316 | 121 | 24 | Moderate |
| 21 | Purple / Dense / Blue Dense | 88320 | 163 | 230 | 174 | 1120 | 264 | 198 | Moderate |
| 22 | Dark Purple | 89856 | 165 | 1919 | 126 | 189 | 184 | 36 | Moderate |
| 23 | Blue | 38080 | 70 | 196 | 122 | 778 | 262 | 41 | Moderate |
| 24 | Dark Purple | 133120 | 245 | 7331 | 118 | 831 | 50 | 755 | Moderate |
| 25 | Purple / Blue (Sparce) | 113152 | 208 | 1715 | 113 | 488 | 73 | 129 | Moderate |
| 26 | Maroon | 130560 | 240 | 394 | 103 | 3204 | 3 | 2261 | Moderate |

Fig. 8b

| | | | | | | |
|---|---|---|---|---|---|---|
| 27 | Dark Purple / Blue | 187136 | 344 | 13365 | 91 | 2679 | 212 | 1681 | Limited |
| 28 | Dark Purple (Sparce) | 176640 | 325 | 275 | 89 | 20 | 0 | 19 | Limited |
| 29 | Purple (Sparce) | 147968 | 272 | 1254 | 87 | 875 | 603 | 160 | Limited |
| 30 | Purple / Dense | 80641 | 148 | 4127 | 78 | 2385 | 288 | 410 | Limited |
| 31 | Dark Purple (Sparce) | 30720 | 57 | 393 | 63 | 489 | 56 | 221 | Limited |
| 32 | Purple | 89856 | 165 | 266 | 59 | 228 | 147 | 20 | Limited |
| 33 | Blue/Dark Purple | 103168 | 190 | 2701 | 47 | 251 | 42 | 137 | Limited |
| 34 | Dark Purple/Pink | 220417 | 406 | 9408 | 45 | 1633 | 84 | 880 | Limited |
| 35 | Dark Purple / Blue (Sparce) | 288768 | 531 | 1178 | 35 | 491 | 100 | 166 | Sparce |
| 36 | Dark Purple / Blue | 61440 | 113 | 483 | 24 | 443 | 101 | 178 | Sparce |
| 37 | Light Baby Blue | 60929 | 112 | 199 | 17 | 386 | 28 | 25 | Sparce |
| 38 | Dark Purple / Blue | 69120 | 127 | 212 | 17 | 278 | 13 | 244 | Sparce |
| 39 | Dark Purple | 204288 | 376 | 47 | 16 | 253 | 3 | 159 | Sparce |
| 40 | Dark Blue | 204800 | 377 | 2346 | 15 | 187 | 20 | 44 | Sparce |
| 41 | Light Purple/Pink | 188928 | 348 | 19 | 10 | 48 | 9 | 37 | Sparce |
| 42 | Light Purple/Pink | 41344 | 76 | 367 | 7 | 69 | 40 | 13 | Sparce |
| 43 | Purple (Sparce) | 66560 | 122 | 1904 | 7 | 49 | 17 | 40 | Sparce |
| 44 | Light Baby Blue | 28672 | 53 | 704 | 6 | 68 | 38 | 6 | Sparce |
| 45 | Purple / Blue (Sparce) | 86528 | 159 | 353 | 2 | 88 | 0 | 99 | Sparce |
| 46 | Light Purple (Very Sparce) | 91200 | 168 | 331 | 0 | 0 | 24 | 62 | Sparce |
| 47 | Maroon | 96512 | 178 | 55 | 0 | 395 | 4 | 350 | Sparce |

Malignant Recall 99.05% Selectivity 99.62%

| True Class | | | | | | |
|---|---|---|---|---|---|---|
| Benign | 4067 | 8 | | 5 | 27 | 99.0% / 1.0% |
| Lymphocyte | 2 | 1562 | 1 | | | 99.8% / 0.2% |
| Neutrophil | | 2 | 1069 | | | 99.8% / 0.2% |
| Macrophage | 7 | 1 | | 780 | 1 | 98.9% / 1.1% |
| Malignant | 42 | 2 | | 5 | 2921 | 98.4% / 1.6% |

| 98.8% | 99.2% | 99.9% | 98.7% | 99.1% |
|---|---|---|---|---|
| 1.2% | 0.8% | 0.1% | 1.3% | 0.9% |
| Benign | Lymphocyte | Neutrophil | Macrophage | Malignant |

Predicted Class

RAPID ON-SITE EVALUATION USING ARTIFICIAL INTELLIGENCE FOR LUNG CYTOPATHOLOGY

FIELD OF THE INVENTION

The present invention relates to the field of computer-assisted cytopathology. More particularly, the present invention relates to the use of artificial intelligence and machine learning to improve rapid on-site evaluation cytopathology, which can be used in connection with lung biopsies.

BACKGROUND OF THE INVENTION

Currently, many pulmonologists are working to speed the process of diagnosing lung cancer in order to provide treatment as soon as possible. In particular, many are attempting to combine the provision of therapy into the same procedure as the diagnosing of the condition. For this approach to be implemented, pulmonologists need access to tools that facilitate rapid assessments of pathological sample adequacy and potentially even enable medical professionals to make intra-procedural pathological diagnosis.

To accomplish this, many facilities have begun using Rapid On-Site Evaluation (or "ROSE"), which involves a cytopathologist participating as part of the biopsy procedure to provide immediate evaluation of a tissue sample. This is an interactive and consultative process between the pathologist and the clinician performing the procedure. ROSE can provide immediate assurance of the adequacy of tissue samples, increasing the sensitivity and accuracy of biopsies. Unfortunately, many facilities are not able to have a cytopathologist on-site to provide this service.

SUMMARY OF THE INVENTION

The described embodiments may be used to assist a cytopathologist in performing ROSE services from a location remote from where the biopsy is taken. The embodiments incorporate artificial intelligence capabilities such as, for example, machine-learning image recognition algorithms that utilize pre-trained convolutional neural networks (CNNs). A local computer system uses the CNNs to analyze digital images created by an on-site microscope. Sample tissue is placed on a slide, stained, imaged by the microscope, and then analyzed by the local computer system.

In one exemplary embodiment, the system requests an initial, low-resolution thumbnail of the slide. This thumbnail is first analyzed using a CNN to determine whether the slide is of sufficient quality for further analysis. If not, a replacement slide is requested. If so, the thumbnail is analyzed using a second CNN for potential areas of interest. In most cases, multiple areas of interest are identified, and the second CNN ranks these different areas of interest based on the perceived likelihood of showing abnormal cells.

The system will then request the microscope to obtain a full resolution whole slide image (WSI) of the slide, scanning regions of the slide identified as most likely to contain cells of interest before scanning other regions of the slide. Full resolution images are then divided into a plurality of smaller images for further processing. These smaller subregions are referred to as tiles.

The local computer system then analyzes each of the identified tiles from the streamed images in the prioritized order they are received from the microscope. This analysis is performed by a separate CNN that classifies the cells present in the tile, along with a confidence of the classification. In one embodiment, this CNN performs this function solely based on the two-dimensional images obtained from the microscope. In other embodiments, the analysis is improved by analyzing both the tile image as well as site-specific data related to the biopsy site, such as the oxygen levels at that site and/or the tissue density identified at that site. For example, in many cases cancerous cells may be subject to a condition of hypoxia (low oxygen levels) as a result of an enlarging tumor outgrowing a surrounding network of blood vessels. To allow this analysis, the site-specific data will have been used as inputs while training the CNN.

In some embodiments, the microscope obtains images at different focal planes on the slide, effectively creating multiple levels of images for each tile on the WSI. These different images are from different depths on the slide, thus giving an additional dimension to the images. These plurality of levels for each locations are utilized when training the CNN, and then further utilized when analyzing a particular tissue sample using the CNN during a ROSE procedure. Multiple image levels can be further combined with site-specific data to further define and improve the histological classification of the cells present in the tile.

Tiles containing classified pathology can be remotely reviewed. Prioritized classification allows significant data transfer optimizations by only transmitting image data for tiles and immediately adjacent regions of high-confidence cells of the desired cell type. The remote pathologist can select which cell classifications to view. This approach results in only a very small percentage of the high-resolution WSI image data being transmitted to the remote viewing computer. Transmitting sub-regions of the WSI is made possible by the prioritized classification of cells by the CNN.

In some embodiments, semantic segmentation is performed on the individual cells identified within the tiles at the local computer system. Nuclei shape and size of individual cells can be identified, analyzed and unique instances counted. When multiple level images are analyzed, nuclei volume can also be calculated allowing three-dimensional volumetric analysis of the pathology. Ratios of nuclei size and volume between different cells within the same tissue sample can be calculated. The semantic segmentation and resulting size, volume, and instance count analysis can be used to perform histological analysis of the sample. The analysis can be displayed on the local computer and/or transmitted to the remote cytopathologist for review.

The user interface may be viewed remotely and may enable the cytopathologist to provide commentary, feedback, requests, and conclusions back to the clinician performing the biopsy, thereby allowing quick interaction as part of the ROSE process. The use of the CNNs allows the system to identify tiles of interest and quickly report key metrics on the sample, dramatically decreasing the time required for a cytopathologist to evaluate and report the adequacy of a biopsy sample.

BRIEF DESCRIPTION OF THE DRAWINGS

FIG. 9 is a confusion matrix chart showing the results of performing the method of FIG. 6.

DETAILED DESCRIPTION

System

Figure 1:
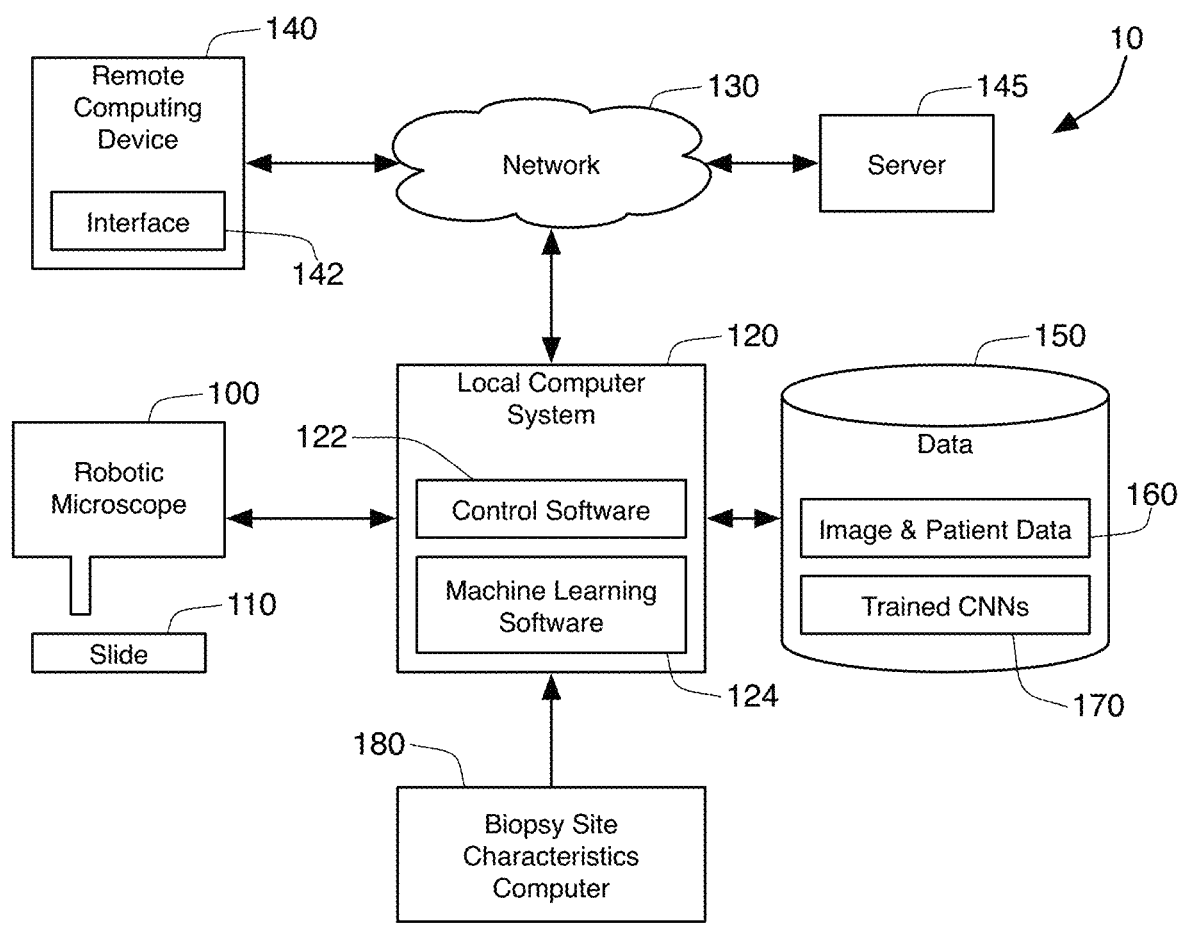
FIG. 1 is a schematic view of a system for implementing one embodiment of the present invention.
Figure 2:
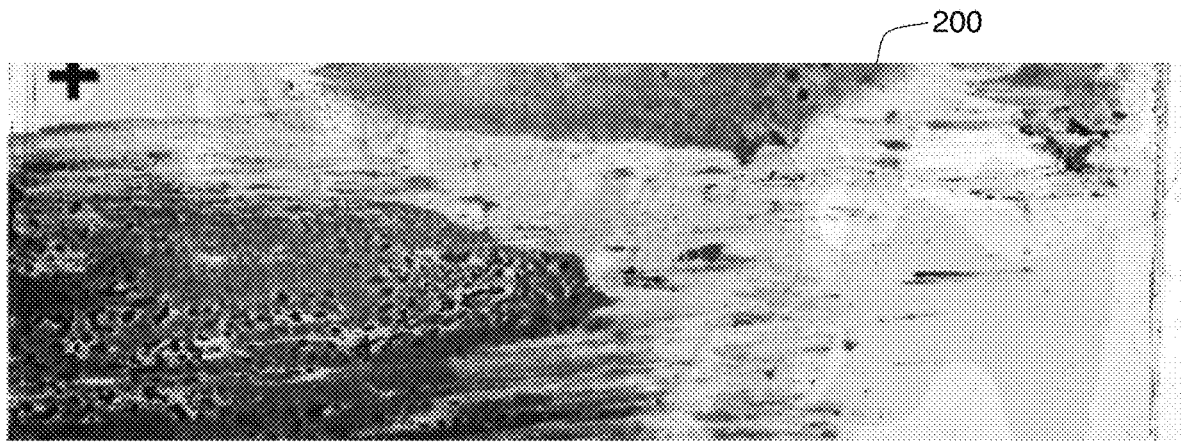
FIG. 2 is an example whole slide image.

FIG. 1 shows a system 10 for performing functionalities of the various embodiments described herein. The system 10 utilizes a robotically controlled microscope 100 to obtain images of a slide 110 that contains a prepared biopsy tissue sample. In one embodiment, the robotically controlled microscope 100 is a Ocus 20 digital scanning microscope from Grundium Oy (Tampere, Finland) having incorporated therein high-performance X Line™ objectives from Olympus Corporation (Tokyo, Japan). The microscope 100 is designed to create a high-definition whole slide image (WSI), which can take 2-4 minutes to acquire depending on specimen size. At a magnification of 20×, the WSI can be multiple gigabytes in size and contain billions of pixels. In one embodiment, the slide is 110,592 pixels wide by 53,248 pixels tall, creating a file that is 2.9 GB in size. FIG. 2 shows an example of whole slide image 200 created by the microscope 100. Alternatively, the microscope can be requested to take a low-resolution overview thumbnail of the entire slide prior to initiating the detailed WSI scan. Furthermore, the microscope 100 can be instructed to generate a high-resolution scan of only a requested portion of the slide 110.

The microscope 100 is under the control of, and directs its images to, a local computer system 120. This computer system 120 contains control software 122 to control the microscope 100 and to receive images (such as WSI 200). The high-resolution images can be locally processed by the computer system 120. Sub-regions of the WSI 200 identified as containing cells of interest can be shared over a network 130 to a remote computing device 140 using the techniques described below. The images can also be stored in data 150 for later review. In some embodiments, the interaction between the local computer system 120 and the remote computing device 140 does not occur directly between these two devices 120, 140, but is instead controlled and managed by a server computer 145.

In some embodiments, an additional computer 180 forms part of the system 10 to obtain data concerning the location where the biopsy sample was taken from the body. In one embodiment, the computer 180 may be responsible for imaging the body or navigating medical instruments, and can detect information about the biopsy sample location relative to other imaging modalities, such as CT or ultrasound. For instance, the computer 180 may have access to data acquired from a CT scan, and the data may relate to the radiodensity (in Hounsfield units) of the sample location. The computer 180 may also communicate with the biopsy probe to receive data acquired by that probe, such as the tissue oxygen level at the sample site.

The local computer system 120, the remote computing device 140, the server computer 145, and the biopsy site characteristics computer 180 are all computing devices. That means that each device 120, 140, 145, 180 includes a processor for processing computer programming instructions. In most cases, the processor is a CPU, such as the CPU devices created by Intel Corporation (Santa Clara, CA), Advanced Micro Devices, Inc (Santa Clara, CA), or a RISC processer produced according to the designs of Arm Holdings PLC (Cambridge, England). Furthermore, these computing devices 120, 140, 145, 180 have memory, which generally takes the form of both temporary, random access memory (RAM) and more permanent storage such a magnetic disk storage, FLASH memory, or another non-transitory (permanent) storage medium. The memory and storage contain both programming instructions and data. In practice, both programming and data will be stored permanently on non-transitory storage devices and transferred into RAM when needed for processing or analysis.

In one embodiment, the local computer system 120 is a desktop or laptop workstation, such as the Mobile Precision 7750 workstation (Dell Inc, Round Rock, TX). The remote computing device 140 can be either a similar, remote computer workstation or a mobile device. In either case, the remote computing device 140 contains interface software 142 that receives images and provide a user interface to the user of the device 140. In some embodiments, the interface software 142 comprises web browser software, which means that the server 145 will operate as a web server that presents web pages to the browser software 142. The server 145 would first receive the images from the local computer system 120 before presenting such images to the remote device 140.

In other embodiments, the interface software 142 is custom programming that allows for either a direct connection to the server 145 or a direct connection to the local computer system 120 itself. If the remote computer device 140 is a workstation computer, the interface software 142 will comprise one or more application programs. If the remote computer device 140 is a mobile device, the interface software 142 will be an app that operates on the mobile device 140. In some embodiments, multiple remote computing systems 140 exist in the system 10. These multiple systems 140 can receive and display the same information, either concurrently or asynchronously.

In one embodiment, the system 10 is signed to support Rapid On-Site Evaluation (ROSE) analysis and workflow of lung tissue. More particularly, the system 10 supports telecytopathology by allowing a cytopathologist to use the remote computer device 140 to remotely support a ROSE procedure, such as bronchoscopy procedure that analyzes lung tissue. The remote cytopathologist will evaluate the tissue sample found on the slide 110 during a live procedure on a patient.

The data 150 shown in FIG. 1 is stored in some type of data store (also referred to as data or database). This data store 150 may physically be located within or as part of the local computer system 120, or it may be located remotely from the computer 120 over a local area network, a storage area network, or even a remote wide area network. If located remotely, the data store 150 may be controlled by its own data controller computer (not shown in FIG. 1). The data store 150 generally includes defined database entities. These entities may constitute database tables in a relational database, or database objects in an object-oriented database, or any other type of database entity usable with a computerized database. In the present embodiment, the phrase database entity refers to data records in a database whether comprising a row in a database table, an instantiation of a database object, or any other populated database entity. Data within the data store 150 can be "associated" with other data. This association can be implemented using a variety of techniques depending on the technology used to store and manage the database, such as through formal relationships in a relational database or through established relationships between objects in an object-oriented database. In this case, the data 150 contains patient data 160 that might include images or related image data. The patient data 160 may also contain demographic information about the patient, such as their age, gender, race, and smoking-status.

In the illustrated embodiment, the local computer system 120 analyzes images, such as WSI 200, using machine learning software 124 to classify images based on the predominate cells present. Additionally, or alternatively, the machine learning software 124 may be executed in part or in whole remotely from the local computer system 120 (e.g., on one or more cloud-based servers, such as server 145, and/or the remote computing device 140). Image classification may be performed using pre-trained convolutional neural networks (CNNs) 170. These CNNs 170 (or the data supporting these CNNs 170) may also be stored within the data store 150.

Method for Training the CNNs

Figure 3:
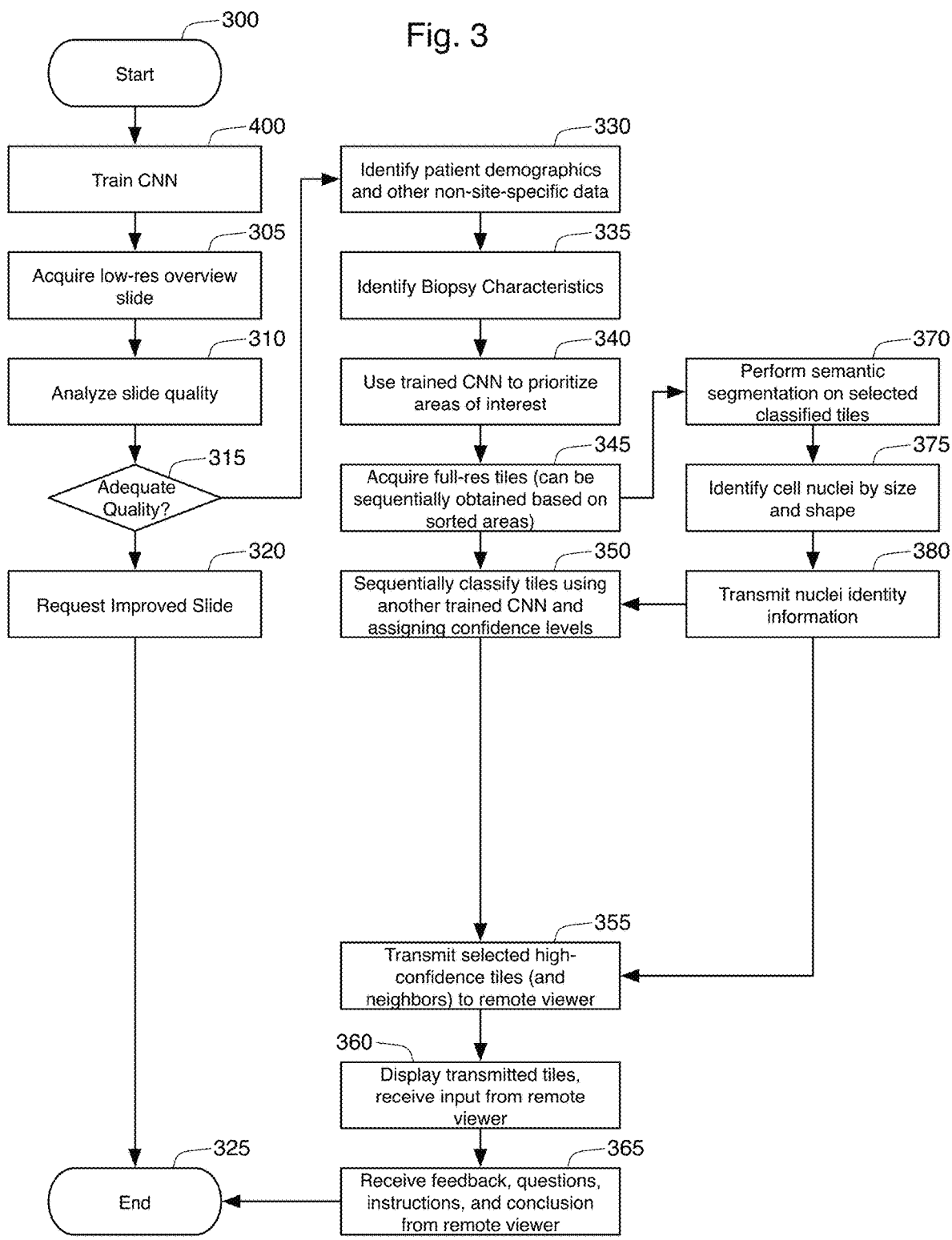
FIG. 3 is a flow chart showing a method for using the system of FIG. 1.

In some implementations, the system 10 may utilize the pre-trained CNNs 170 to analyze the images created by the microscope 100 before presenting such images to the remote computer system 140. This is performed according to method 300, which is shown in FIG. 3. To analyze the images, the method 300 utilizes trained CNNs 170. Therefore, it is necessary that the CNNs 170 be trained before the full method 300 can be performed, which is why the training of the CNNs 170 is the first step 400 in method 300.

Figure 4:
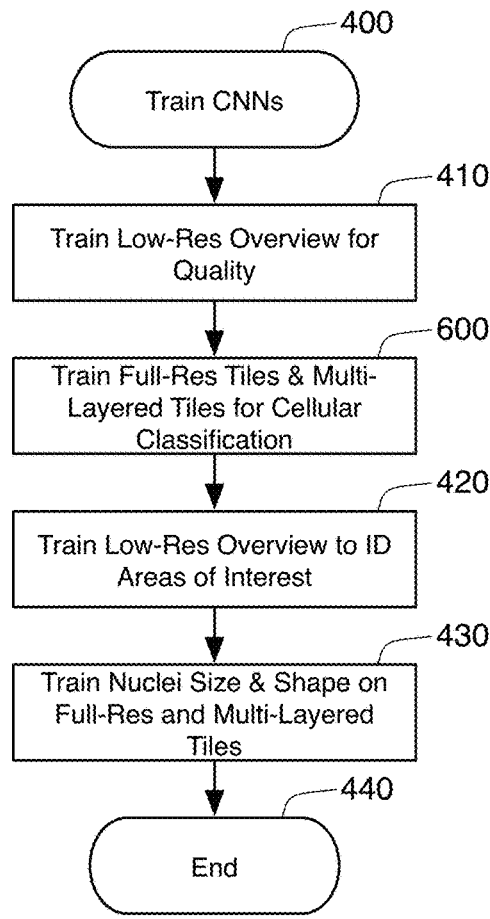
FIG. 4 is a flow chart showing a method for training multiple convolutional neural networks.
Figure 5:
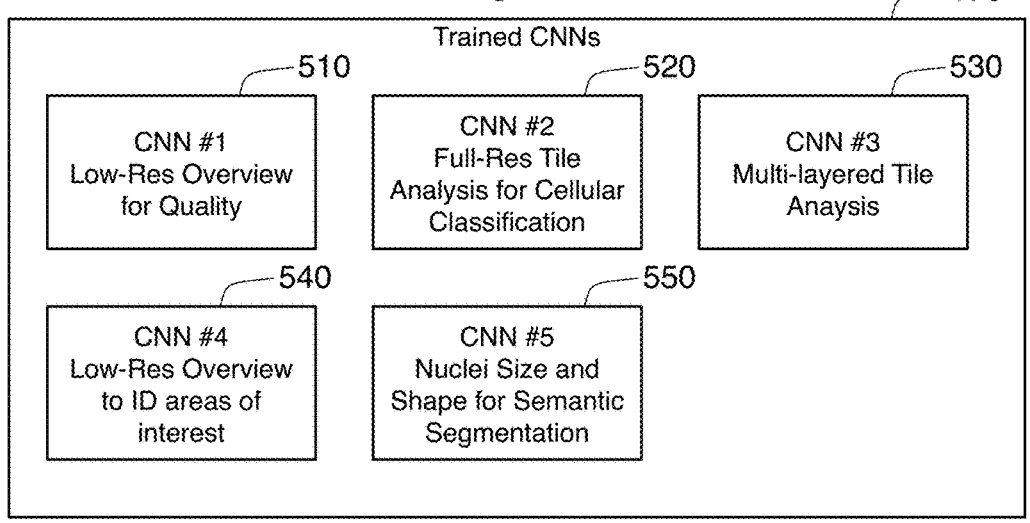
FIG. 5 is a schematic illustration of a plurality of trained convolutional neural networks used by the system of FIG. 1.

The step 400 of training the CNNs 170 is itself presented as a flow chart 400 in FIG. 4. FIG. 4 simplifies the training method 400 into four steps 410, 600, 420, and 430, with each of these steps being associated with the training of a different CNNs 170. FIG. 5 shows these separate CNNs 170. The first CNN 510 is a convolutional neural network that has been trained to analyze a low-res thumbnail of an entire slide to determine whether the slide is of sufficient quality to perform method 300. The training of this CNN 510 is step 410 of method 400. To further understand this step, it is important to understand the nature of a CNN 170.

A convolutional neural network is a type of artificial intelligence. Artificial intelligence is itself a very broad term to cover any type of software that adds intelligence to machines about a particular topic. Machine learning algorithms are a type of artificial intelligence in which computers are able to learn about a topic without being specifically programmed about the details of that topic. Machine learning itself includes a technique called deep learning, which utilizes neural networks. One type of neural networks that is very useful in the field of machine vision, image classification, and recognition is the convolutional neural network. CNNs are an artificial neural network with multiple, hidden convolutional layers and pooling layers, which together make the CNNs very good at learning pattern recognition skills. Each convolution layer in the CNN contains filters that detect visual patterns in an input images, with upper layers detecting basic shapes such as edges, corners, circles, and squares, and deeper layers detecting more complex shapes. A "deep" CNN is a CNN with multiple hidden convolution layers between input and output layers. A CNN can be trained without any specific knowledge about the domain and what type of image is being detected. In other words, the CNN is an example of machine learning, in which the neural network learns to identify objects without the need for explicit programming. The training of a CNN generally uses a technique known as backpropagation, which trains the CNN to modify filters and weights to create the best output in terms of identifying patterns in the input images.

Resources are available to assist in the development and training of new CNNs, including cloud-based platforms such as Google Colab (Google Inc., Mountain View, CA), Amazon SageMaker (Seattle, WA), Microsoft Azure Machine Learning (Microsoft Corp., Redmond, WA), and IBM Watson (IBM, Armonk, NY). In addition, deep learning libraries are now widely available (such as Pytorch, licensed under the BSD open-source license), as are vision datasets (such ImageNet, created through both Stanford and Princeton Universities) and deep learning accelerators (such as Cloud TPU from Google).

In some cases, it is possible to use transfer learning techniques in which a previously trained CNN is adapted for a specific problem by customizing the neural network topology and training with domain specific data. In one embodiment of the present invention, transfer learning techniques are used for the purpose of adapting a previously trained CNN to classify pathology patches in images obtained via microscope 100.

In step 410, the CNN 510 is trained by identifying a plurality of low-resolution thumbnails of tissue slides (similar to slide 110). These images will have been previously identified as either having sufficient quality for analysis or having insufficient quality. Through the process of backpropagation, it is possible for CNN 510 to learn about slide thumbnails so as to categorize the thumbnails as either having sufficient quality, or not.

Figure 6:
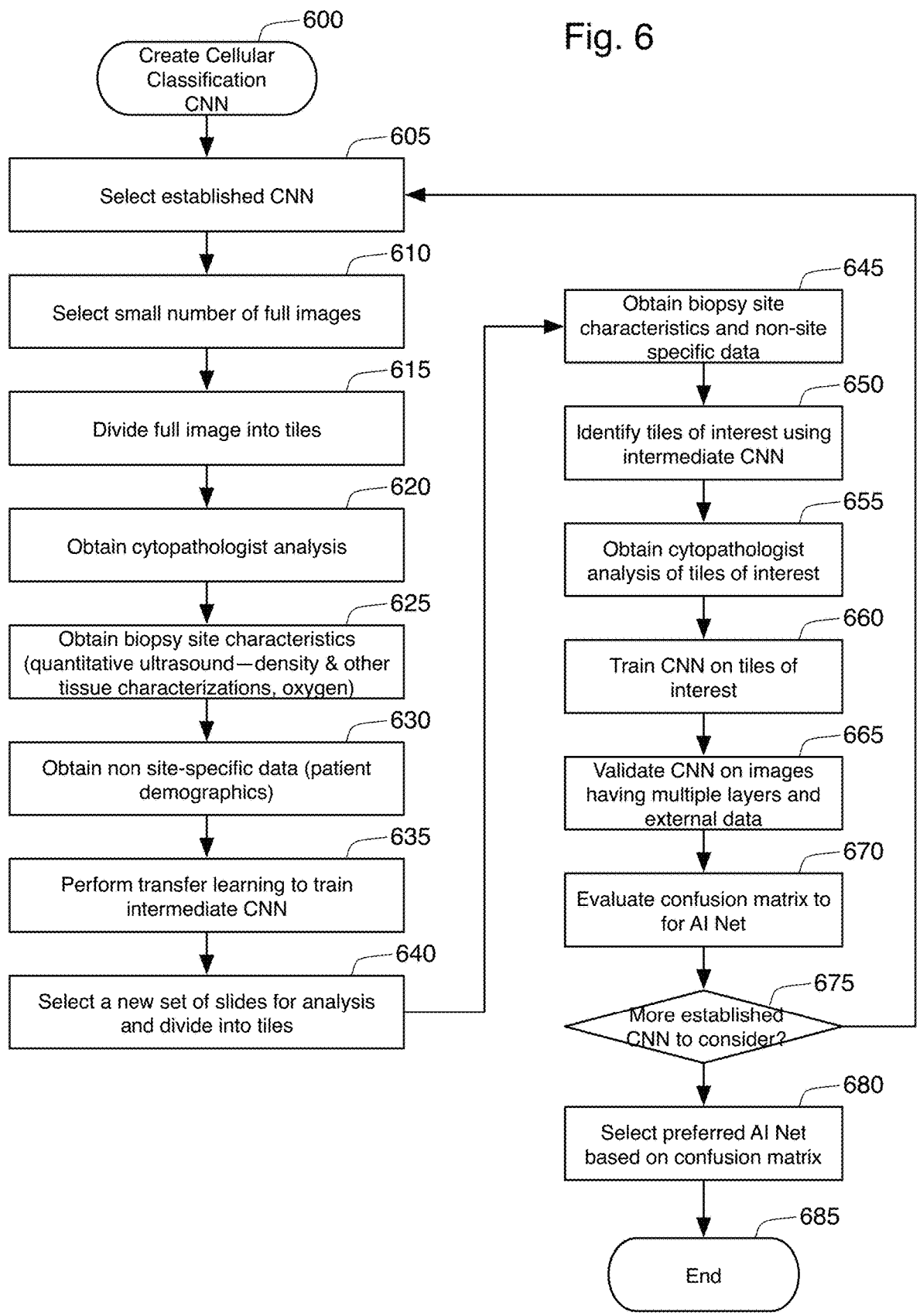
FIG. 6 is a flow chart showing a method for performing cellular classification of a tile derived from a whole slide image.

Step 600 is also method 600, shown in FIG. 6. This method 600 is responsible for training the CNN 170 responsible for cellular classification in a sub-portion or tile of the WSI 200. Some of these embodiments use a two-dimensional image for the WSI 200, while other embodiments use multiple images made at different focal depths of the slide 110 so as to create an additional dimension to the WSI 200 (multiple, "stacked" or "layered" images from different focal planes). In order to use multiple layered images, the microscope 100 must be capable of generating images from different focal planes from a single slide 110. These different embodiments are represented by different CNNs in FIG. 5, with the second CNN 520 being used to analyze a 2D full resolution tile for cellular classification, and the third CNN 530 analyzing a multi-layered tile for cellular classification. The technique for training either type of CNN 520, 530 is similar, and will be described in connection with method 600. Note that multiple dimensional analysis of images in a CNN is known, as color images (with separate red, green, and blue channels) are frequently treated as three-dimensional images with the first two dimensions forming the pixel array, and the third dimension defining the separate colors. If a color image can be considered three-dimensional, a plurality of layered images, each having color, would be considered multi- or many-dimensioned.

As explained above, transfer learning techniques can be used to build a new CNN using a previously trained CNN. The first step 605 of method 600 is therefore the selection of a pre-trained CNN. In the preferred embodiment, five different pre-trained CNNs were evaluated in turn, and tradeoffs were made for accuracy, size, and speed.

The second step 610 is the identification of an initial training set of cytopathologist curated images. The training technique used can be considered a supervised training technique, which requires labeling the "ground-truth" for each datum for the network to learn the domain. Producing ground-truth labeled data requires having a trained cytopathologist review and assign an appropriate label for each image in a training set of images. This is a time intense process, but this is required for the proper training of a CNN.

Figure 7:
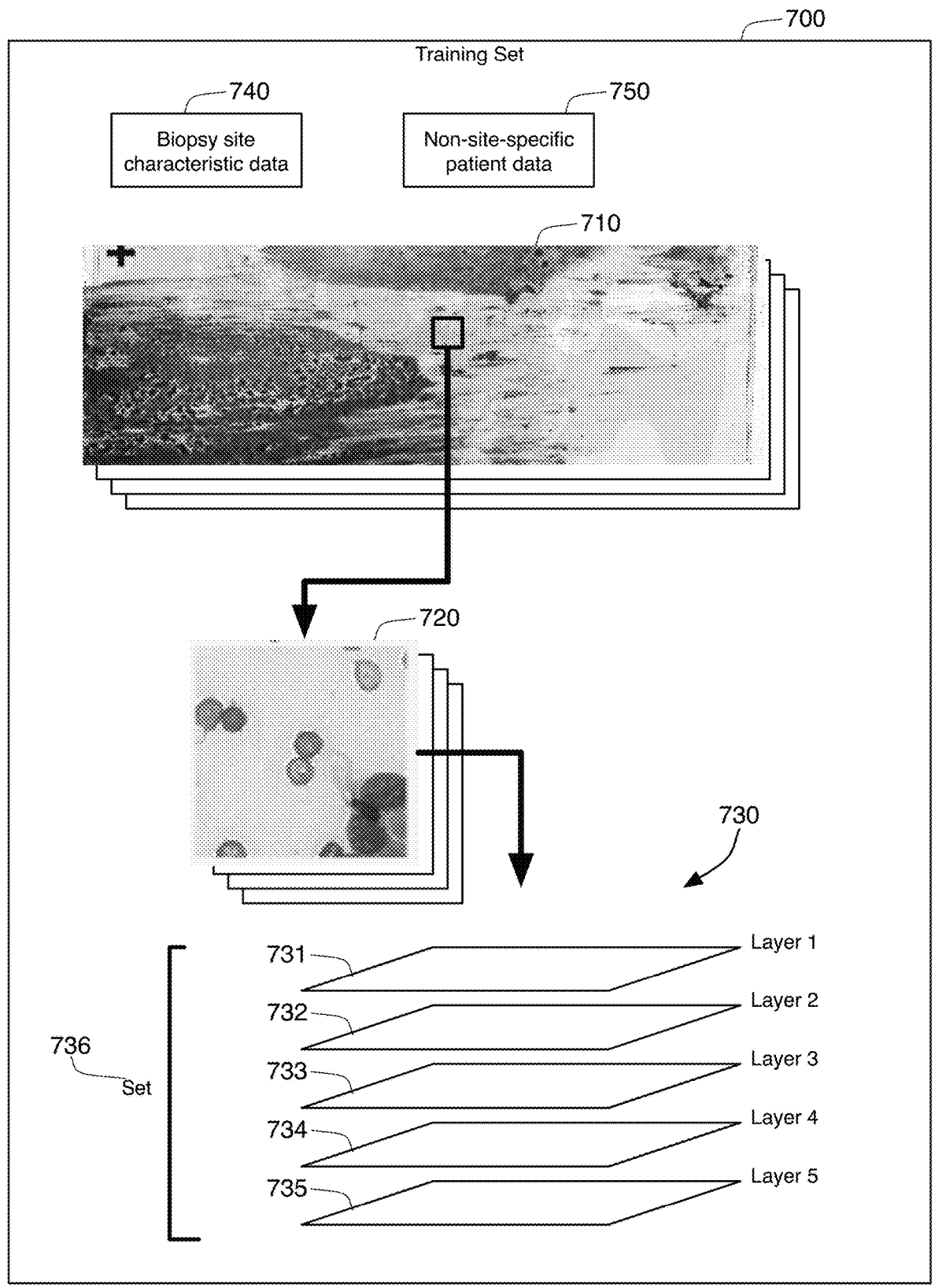
FIG. 7 is a schematic illustration of a training set of data.

To accomplish this, each of the initial set of WSI images are divided into separate tiles in order to form a training set, such as training set 700 shown in FIG. 7. This figure shows a plurality of whole slide images 710 that were identified in step 610. As explained above, each WSI 710 may contain billions of pixels. Each of these image 710 is divided at step 615 into much smaller tiles 720. Each tile 720 might be 256×256 pixels, or even 128×128 pixels. Subdividing a large WSI 710 into 128×128-pixel tiles 720 yields over one hundred thousand tiles 720. While the exact relationship between the number of pixels in a tile 720 and the number of pixels in the whole slide image 710 isn't critical, it is important that the tiles contain many times fewer pixels. In one embodiment, the whole image slides 710 contain at least ten thousand tiles 720. At these ratios, each tile 720 represents a region of approximately 60 $\mu m^2$ per tile at 0.47 $\mu m$ per pixel at a magnification of 20×. It is the massive amount of data available for each image 710 that make it difficult to perform a quick analysis in an effective way without the use of methods 300, 400, 600.

At step 620, labels or categories are assigned to tiles 710 by a cytopathologist reviewing the tile. The review can be made by examining the tile image, or by examining the area of the tile on the slide via a standard microscope. The cytopathologist will identify malignant, benign, lymphocytes, macrophages, neutrophils, and red blood cells ("RBC") in the slide. In one embodiment, the category to be assigned to a tile 720 is defined by the following list:

Malignant—at least one malignant cell, there may be other cell types;
Benign—at least one benign cell, no malignant cells;
Macrophage—at least one macrophage, no malignant cells;
Lymphocyte—at least one lymphocyte and at least one red blood cell, no malignant, benign, macrophage or neutrophils;
Neutrophils—at least one neutrophil and at least one red blood cell, no malignant, benign, lymphocytes or macrophages; and
RBC—at least one red blood cell, no other cell types In addition to these categories, a tile 720 could be labeled as "background" or "undefined," which allows the system 10 to focus only on cleaner patch tiles 720 that did not have strange artifacts, over staining or multiple very crowded cell types within a single patch. It is not necessary that these exact categories be used, but it is important that at least one category is associated with increased concern. In the context of cancer screening, one category should be related to malignancy.

In one embodiment, the initial dataset 700 generated by steps 610-620 consists of approximately 2,000 tiles 720 from a plurality of WSI 710, and the labels for these tiles 720 were distributed across these different categories. In embodiments where multiple layers of images are created, each of these 2,000 tiles are made up of a plurality of layers 730. In FIG. 7, five layers 731, 732, 733, 734, and 735 are shown, which comprise tile-sized portions taken from five different focal plane images created by a microscope from the same slide. These five layers 730 together form a set of layers 736. When multiple layers 730 are present, each tile 720 comprises a set 736 of multiple layers 730. Although five layers 730 are shown in FIG. 7, there is no need to use exactly this number of layers 730. A multi-layered image approach to training a CNN through method 600 would be similarly effective with only two or three layers 730.

The training set 700 also includes characteristic data 740 describing the biopsy site, which is obtained at step 625. These characteristics 740 are obtained during the taking of a biopsy sample in the same manner as computer 180 obtains data related to the biopsy site in system 10. This data 740 might be derived from imaging or navigation data, and therefore could be obtained from segmented CT imaging, ultrasound imaging, or quantitative ultrasound. For example, a system similar to system 10 could use navigated instrumentation relative to a registered 3D segmented CT scan to identify local CT image data relevant to the biopsy location, or use quantitative ultrasound imaging of the biopsy site. Tissue density (including radiodensity) and bodily location (e.g., left lung lobe vs. right lung lobe) information are two examples of relevant biopsy site characteristics 740. Other information that could be used as site characteristic data 740 can be extracted from one or more sensors on a biopsy probe that took the sample tissue. For example, a biopsy probe may incorporate a sensor that measures the tissue oxygen level at sample site. Each individual datum in the biopsy site characteristic data 740 will apply to an entire WSI 710 as a whole, as the entire image 710 will be considered to originate at the same location in the body. Furthermore, in some cases the training set 700 contains information 750 about the patient that is not biopsy site specific, such as demographic information about the patient (such as age, weight, height, gender, and geographic region) or general health status (smoking history, pre-existing conditions, and genetics). This demographic information is obtained at step 630.

As explained above, the thousands of tiles 720 used for the initial data set 700 were selected to have the cytopathologist labels for the tiles 720 spread across the various categories that can be assigned to a tile 720. These tiles 720 (including the layers 730 for each tile), and the biopsy site characteristics data 740 and non-site-specific patient data 750 are then used at step 635 to perform transfer learning on the established CNN to create an intermediate CCN. The non-image data 740, 750 is combined with image information using a merge layer within the CNN after feature extraction from the input image. CNN training of this type requires a large amount of data (up to thousands of tiles), and there are augmentation techniques that are commonly used to increase the data and strengthen the training and results. As part of this training, it is important to account for the fact that all microscope images 710 are direction invariant and the sharpness of the cells in each image tile 720 can vary considerably. Additionally, slide staining varies depending on the specimen, and color balance fluctuates by the automated white balance function used by the microscope. To overcome these issues, the training process will used image rotation (90, 180, 270 degrees), flipping and color augmentation. Color augmentation is performed by adding random RGB offsets to the tiles 720. Identifying patches across a multitude of different staining characteristics is important to the robustness of the trained CNN, as the variation across slides can be quite significant.

A feedback cycle, such as backpropagation, is used as part of this step 635 in creating the intermediate CNN. The accuracy of a CNN can be examined by considering a confusion matrix, which is described in more detail below.

The confusion matrix for the intermediate CNN is less than perfect and resulted in many false positives and negatives, but this was acceptable at this stage since this intermediate CNN is to be used for data collection and identifying patches of interest, as is described immediately below.

At step 640, a new set of slides are selected and imaged. If the original training set 700 contained multiple layers 730 for the image, the images for the slides selected in step 640 will have similar layers 730. These images are also divided into tiles 720. For each slide, biopsy site characteristic data 740 and non-site-specific patient data 750 are also obtained. At this point, a new training set 700 based on these new images from step 640 will be created. The intermediate CNN is then applied to this new training set in order to identify a subset of the total number of tiles 720 as tiles of interest. Tiles of interest are those tiles 720 that the intermediate CNN believes to contain abnormal cells with a confidence level of approximately 90%. Running the intermediate CNN against each new slide image 710 produced less than 10 to several hundreds of tiles 720 of interest for each new image 710. At step 655, these tiles of interest were then submitted for manual review by a cytopathologist for labeling using the above-established definitions.

At step 660, the tiles 720 of interest, as determined by step 650 and labeled at step 655, are used to further train and improve the CNN in step 660. As with the training of the intermediate CNN, this CNN was iteratively improved through feedback during the training process. All tiles 720 from the images 710 from step 640, for instance, can be analyzed anew by the new CNN to see if additional tiles of interest are generated. The classifications for these tiles 720 generated by the new CNN are reviewed and adjusted by a cytopathologist, and the network re-trained on the updated dataset. This iterative feedback cycle of training, classifying, tweaking, and re-retraining produces a considerably larger training set (with pathology images from many prepared slides) than would have been otherwise possible with manual labeling, with each revised version of the CNN being an improvement over the prior version. Of course, the steps of image rotation and color augmentation described above can also be applied in this process.

The end result of step 660 is a trained CNN that is able to classify tiles 720 from a large selection of images 710, representing a range of pathology and stain variations. Furthermore, this trained CNN is capable of analyzing the image content of each tile 720 along with data 740, 750 known about each sample, including, for instance, information about the location of the biopsy sample site relative to a segmented CT scan, endobronchial ultrasound (EBUS) and/or quantitative ultrasound imaging, and tissue oxygen levels at the biopsy site.

In one embodiment, all of training of the CNNs was done using the Matlab programming language and the Deep Learning Toolbox (both from The MathWorks, Inc., of Natick, MA) on a workstation running Windows 10 with one Quadro RTX 3000 graphic card (6 GB of RAM) (from Nvidia, Santa Clara, CA). Each model was trained for 12 epochs, with a mini batch size of 32 and an initial learning rate of $3e^{-4}$.

The trained CNN is then validated at step 665 against a validation set of images 710, with these validation images 710 also having multiple layers 730 and associated data 740, 750. In one embodiment, the CNN training and validation at steps 650, 655 was achieved using images from 47 prepared slides. Over 6.3 million tiles 720 were identified and analyzed by the CNN, and approximately 50,000 tiles of interest were labeled for training and validation, with 70% were used for training and 30% held-out for validation. These slides that had a broad distribution of staining characteristics and cell density. The training and validation sets were randomly defined during each training cycle and therefore would change with each run.

Figures 8, 8A, 8B:
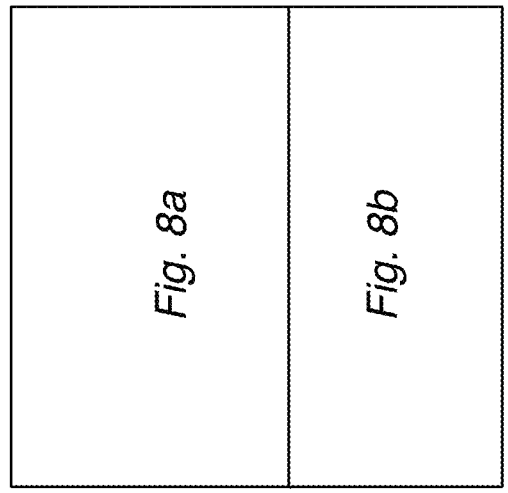
FIG. 8, divided into
FIGS. 8a and 8b, is a table of data created during the method of FIG. 6.

The trained CNN also resulted in a very high percentage (>70%) of patches being above 95% confidence in the assigned label. Highlighting the difficulty of the task cytologists perform each day is the fact that only 4% of the slide area had areas of interest such as benign, lymphocytes, neutrophils, macrophages and malignants and the majority were simply red blood cells and artifacts. These results 800 can be seen on FIG. 8. Suspicious tiles are identified in these results 800 with a high confidence level (a level of 90% or even 95% confidence), and ranged from zero suspicious tiles 720 in a slide image 710 to 10,673 suspicious tiles 720. The effectiveness of the trained CNN was confirmed for each slide to be correct. The results 800 are sorted by the count of suspicious tiles 720, and then grouped according to that count into Abundant (highest suspicious tile count), Moderate, Limited, and Sparce (lowest suspicious count) categories. It is rather easy for a cytologist to observe the Abundant and Moderate top fifty (50) highest confidence tiles 720 and definitively state the slide is highly suspicious and most likely malignant. Limited patches were able to quickly be reviewed and determine if malignant material was present. The trained CNN was also quite effective at identifying lymphocytes to determine if the sample was within the lymph node.

For each run a confusion matrix was generated (step 670) and evaluated for accuracy, strength, and robustness across different slide types. The confusion matrix 900 shown in FIG. 9 is an example of the results obtained. The confusion matrix 900 shows the label of histological tissue type as assigned by the cytopathologist on the Y-axis of the chart as the "true class," and the results of the analysis by the trained CNN on the X-axis. The trained CNN was found to be very stable as multiple trainings with randomized inputs from the data resulted in effectively the same confusion matrix.

At step 675, the method 600 determines whether more established CNNs should be considered back in step 605 to form the basis of a newly generated CNN. If so, the method returns to step 605. If not, step 680 selects the best CNN based on the highest performing established CNN. In one embodiment, it was determined that the GoogLeNet CCN was the best performing pre-trained CNN by this method 600. Training on 35,868 cytopathologist reviewed tiles and validating against 15,373 reviewed tiles, achieved a 99.0% recall (true-positive rate) and 99.0% specificity (true-negative rate) for suspicious (tiles classified as malignant or suspicious by cytopathologist). The method 600 then ends at step 685.

Returning to FIG. 4, method 600 successfully trained the CNN for performing histological categorization of slide tiles 720. The above description made repeated reference to the multiple layers 730 present at each tile 720. Nonetheless, the same method 600 can be utilized for systems where the microscope cannot take multiple focal depth images of the same slide. The training for the intermediate and final CNNs can be based only on single-layer color image for each tile. In this way, separate CNNs can be trained, with one CNN 520 being trained for single-layered image applications and one CNN 530 being trained for multi-layered image applications.

At step 420, a separate CNN 540 is trained in order to identify areas of interest for further evaluation based on the analysis of a low-res (or thumbnail) image generated from the microscope 100. The trained CNNs 520, 530 have already identified suspicious tiles 720 in the training sets 700. Low-res images of the same slides can be likewise divided into sub-portions having the same relative size as the tiles 720 with respect to the WSIs 710. CNN training can then use transfer learning techniques to take existing image recognition CNNs and specially train them to identify sub-portions in the low-res images that are associated with suspicious tiles 720 in the training sets 700. Through the training and feedback techniques described above, this CNN 540 will be able to use the low-res image received from a microscope to identify sub-portions where the full-resolution tiles 720 should be examined for suspicious cells.

Figure 10:
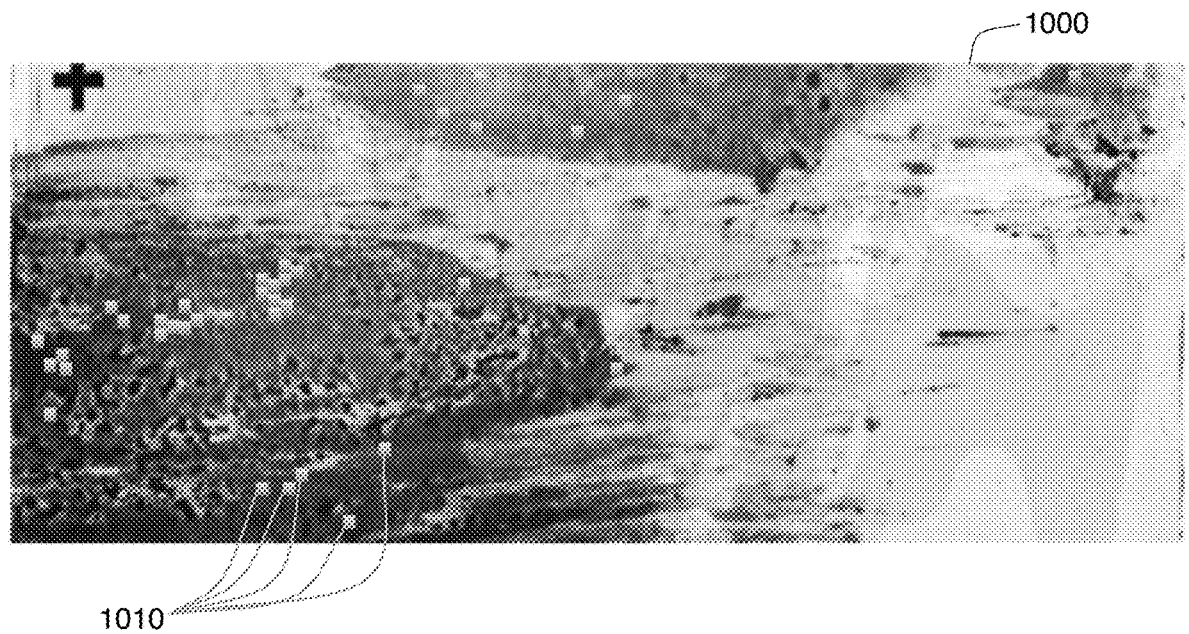
FIG. 10 is an illustration of classified cells overlayed on a low-resolution overview image.

FIG. 10 shows a low-resolution image 1000 version of WSI 200 after being analyzed by trained CNN 540. Identified sub-portions 1010 (only a portion of which are numbered in FIG. 10) are identified directly on this image 1000, indicating areas requiring further evaluation. This results in the "heatmap" shown in FIG. 10, where areas of interest 1010 indicate areas of the slide image 1000 that should be studied in more detail. Note that the analysis using CNN 540 is intended to trigger further analysis of the high-resolution image at the related tile locations. Consequently, it is not necessary that the low-resolution CNN 540 accurately identify only tiles 720 containing suspicious cells, but rather that it functions to focus the high-resolution analysis on those areas of the overall slide 110 that are likely to contain suspicious tiles 720.

At step 430, a fifth CNN 550 is trained for semantic segmentation of nuclei found on the individual tiles 720. This semantic segmentation CNN 550 is trained to assign a histological tissue type (HTT) probability for each pixel of the image tiles 720. This technique can be applied to all tiles 720 comprising the WSI image 710, and analytics of the tissue cytology can be processed and reported. Semantic segmentation allows the dimensions of the nuclei to be measured and reported, including the maximum and minimum dimension of each segmented nucleus, along with shape analysis of its roundness. The maximum nuclear dimension of malignant cells is well differentiated from that of benign cells. While the ratio of nuclear dimensions is well established, this ratio must be applied between cells from the same individual. Size differences are known to exist from person to person. Furthermore, providing multiple layers 730 of imagery acquired at a plurality of focal depths to this trained CNN 550 allows semantic segmentation to perform three-dimensional pathology analysis, classifying pathology based on the shape and volume of the nuclei.

Figure 11:
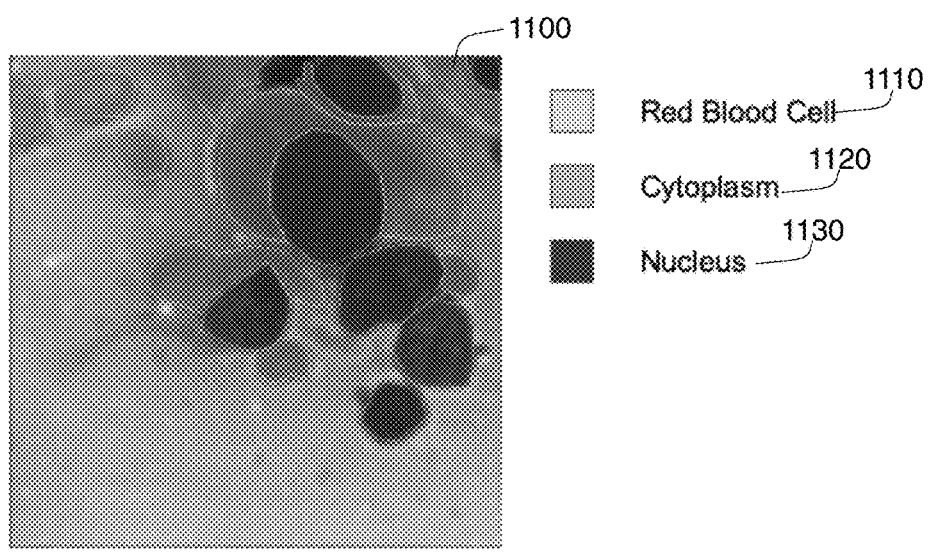
FIG. 11 is an illustration of a tile after semantic segmentation.

FIG. 11 shows the result of utilizing the trained semantic segmentation CNN 550 onto the cells imaged in a particular tile 1100. Based on the size and shape of the cells, the CNN 550 was able to identify certain cells as red blood cells 1110, certain areas as cytoplasm 1120, and certain areas as cell nucleus 1130. In a study of an actual sample slide 110, this information will be reported to the remote cytopathologist to help in the analysis of the histopathology present in the slide 110.

This segmentation of the tile 720 is important as it relates directly to the task performed by the cytopathologist. In the cytology, the size of the nucleus, the proportion of the nuclei to each other, the amount of chromatin, and the nucleolus are clearly observed to evaluate the degree of cell atypia. Additionally, the shape of the cell clump and the color of the cell are observed for cell type classification. Creating a segmentation CNN 550 with both high sensitivity and high specificity would be perfect, but in most cases, as sensitivity is increased, the specificity decreases leading to false positives due to variability related to tissue staining and preparation. This variability is not only seen across multiple facilities, but within each individual lab. Consequently, the segmentation CNN 550 is designed primarily to provide an aid to the cytopathologist and to assist in classification of a tile of interest.

Nonetheless, in one embodiment the information generated by this trained CNN 550 is utilized as input by the CNNs 520, 530 to improve the histological categorization of slide tiles. Segmenting the nuclei and using the maximum nuclear dimension as an input for classification helps to normalize the sample for stain variance, as the nuclear boundary in the prepared slides can be affected by the staining technique. In this embodiment, the training of the CNN 550 in step 430 would occur before the training of CNNs 520, 530 in method 600, so that the output of this CNN 550 can be used as one of the inputs into these categorization CNNs 520, 530.

The training of this CNN 550 in step 430 can also utilize transfer learning techniques and the feedback techniques described above. After this CNN 550 is trained, the training method 400 terminates at step 440.

Method for Utilization of Trained CNNs

Returning now to the method 300 of using system 10, we see that the above description relates only to the first step 400 of the method 300, that of training the various CNNs 170. Once the CNNs 170 are trained, the system 10 can be utilized to perform remote rapid on-site evaluation (ROSE) cytopathology in connection with a plurality of lung biopsies.

The first step 305 of the method 300 after the CNNs 170 are trained is to obtain a low-resolution or thumbnail image from the slide 110. This step 305 presupposes that the lung biopsy sample has been taken from the patient, and that a slide 110 for that sample has been prepared and placed in the microscope 100. Once the low-resolution image is obtained at step 305, step 310 will examine the overall slide quality using the first CNN 510 that was previously trained for this analysis. The results of the analysis of the first CNN 510 will determine whether the slide is of adequate quality at step 315. If it is not, the local computer system 120 will request that the slide be corrected, or that a replacement slide or sample be prepared at step 320. In this case, the method 300 will begin again when the improved slide is prepared, although it will not be necessary to retrain the CNNs 170 through method 400 for each new slide.

At step 330, the system 10 will identify patient demographics and other non-site-specific data 160 from the data store 150. This data may include the patient's age, weight, height, gender, and geographic region, as well as the patient's smoking history, pre-existing conditions, and genetics. At step 335, site-specific biopsy characteristics are obtained, such as from the biopsy site characteristics computer 180. Tissue density (including radiodensity), bodily location (e.g., left lung lobe vs. right lung lobe), and tissue oxygen level are examples of the site-specific data that might be acquired at step 335.

At step 340, the fourth trained CNN 540 is applied to the low-resolution image to identify areas of interest, such as the areas 1010 shown in FIG. 10. These areas 1010 can be ranked based on the confidence level assigned by the CNN 540 to create a prioritized or ranked list of areas on the slide 110.

At step 345, the microscope 100 is directed to make one or more high resolution scans of the slide 110. Depending on the capabilities of the microscope 100, step 345 will take either a single layer image or a multi-layer image. In one embodiment, the microscope 100 is directed to make a single, whole slide image 200 from the slide 110. In another embodiment, the microscope 100 is first directed to make high-resolution scans of the areas 1010 identified by step 340. As explained above, the generation of the single WSI 200 currently takes between two and four minutes. Future improvements to microscope processing power will no doubt reduce this time significantly. If the two-to-four-minute duration of the scan does not make any significant difference in the overall ROSE process, or when the time for taking the WSI 200 is sufficiently reduced, taking the WSI 200 at step 345 will be preferred. However, the overall method 300 can be accelerated by acquiring only full-resolution images of the areas of interest 1010 in the ranked order identified by step 340. In this context, the control software 122 will sequentially instruct the microscope 100 to take the scans of the areas 1010 identified and sorted in step 340.

Step 345 is also responsible for dividing the acquired images into tiles 720. If the full WSI 200 is acquired, the dividing of the WSI 200 into individual tiles 720 will happen in the same matter as described above in connection with FIG. 7. If step 345 acquired the full-resolution image region-by-region, the tiles 720 will be created from these individual regions. In some embodiments, the microscope will be able to successfully identify a single tile-sized region (such as a single 128×128-pixel region) and directly scan a single tile 720. If the areas of interest 1010 identified in step 340 are each multiple tiles in size, the full area will be imaged and then divided into multiple tiles 720. Analyzing the low-resolution overview image in step 340 with CNN 540 allows the areas of the slide 110 with the highest probability of malignant cells to be scanned before scanning the remaining areas of the slide 110.

The next step 350 utilizes one of the trained CNNs 520, 530 responsible for cellular classification to classify the tiles 720. The CNN 520, 530 will be selected based on whether the tiles 720 contain single-layered images or multi-layered images of differing focal depths. The classifications (or categories) assigned will be selected from the list of possible classifications set forth above. Of course, it is possible to change the number and meaning of these individual classifications and still be within the scope of the present invention. As explained before, this analysis may also utilize the biopsy characteristics identified in step 335 and the non-site-specific data acquired in step 330 to the same extent that this data was utilized in the training of the CNN 520.

The analysis of the individual tiles 720 in step 350 will be prioritized according to the prioritized list created in step 340. The processing time of the individual tiles 720 in step 350 may take longer than the image acquisition time of the microscope 100, thus the processing in step 350 is prioritized based on the ranked list created by step 340.

At step 355, classified tiles 720 will be transmitted to the remote computing device 140 for presentation to the cytopathologist. A ranked listing of tiles 720 available for evaluation can be presented over the user interface 142 of the remote computing device 140. This ranked list can be based on the likelihood of a tile 720 contains abnormal cells—a likelihood that was assigned by the CNN 520/530 during step 350. Tiles 720 having the highest likelihood will be presented first to the cytopathologist. In a preferred embodiment, the user interface presented by the remote computing device 140 will also present the thumbnail image 1000 showing the location of the highest ranked tiles 720. This will create a heat map similar to that shown in FIG. 10, with the highest ranked tiles being locationally identified on the image 1000.

Ordering the classification of tiles 720 in step 350 based on the ranked areas of interest from step 340 allows the most likely tiles 720 to be analyzed first, meaning that the pathology of interest can be presented to the cytopathologist just a few seconds after scanning is initiated, rather than waiting several minutes for the whole slide image scan to complete and many more minutes for a detailed analysis of the entire WSI 200. In some cases, step 350 can still be classifying tiles 720 covering areas of lesser interest when step 355 has already begun to transmit tiles that have already been categorized as having concern (such as being categorized as malignant). This relieves the requirement of a cytopathologist being integrated locally into the workflow and staff of the biopsy procedure. A remotely located cytopathologist can asynchronously review and analyze the prioritized cytology tiles 720 and provide comments and conclusions back to the biopsy team regarding the adequacy of the collected tissue samples on slide 110.

Figure 12:
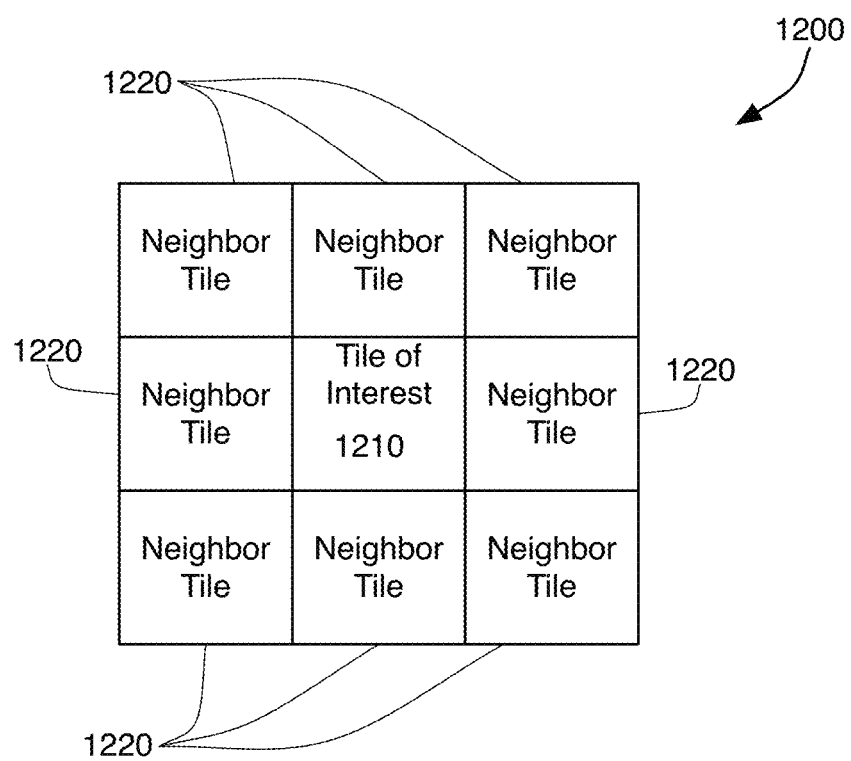
FIG. 12 is a schematic view of a tile of interest as presented along with neighboring tiles.

In one embodiment, tiles 720 are presented through the remote computing system 140 in context. This context is created by creating a three-tile by three-tile view 1200 (as shown in FIG. 12) and presenting that view. In this 3×3 view, the tile of interest 1210 is presented in the middle of the view 1200, with neighboring tiles 1220 presented on each side and at each corner of that tile 1220. The goal is to provide sufficient context to the cytopathologist to enable them to have the confidence to make a malignancy decision.

Figure 13:
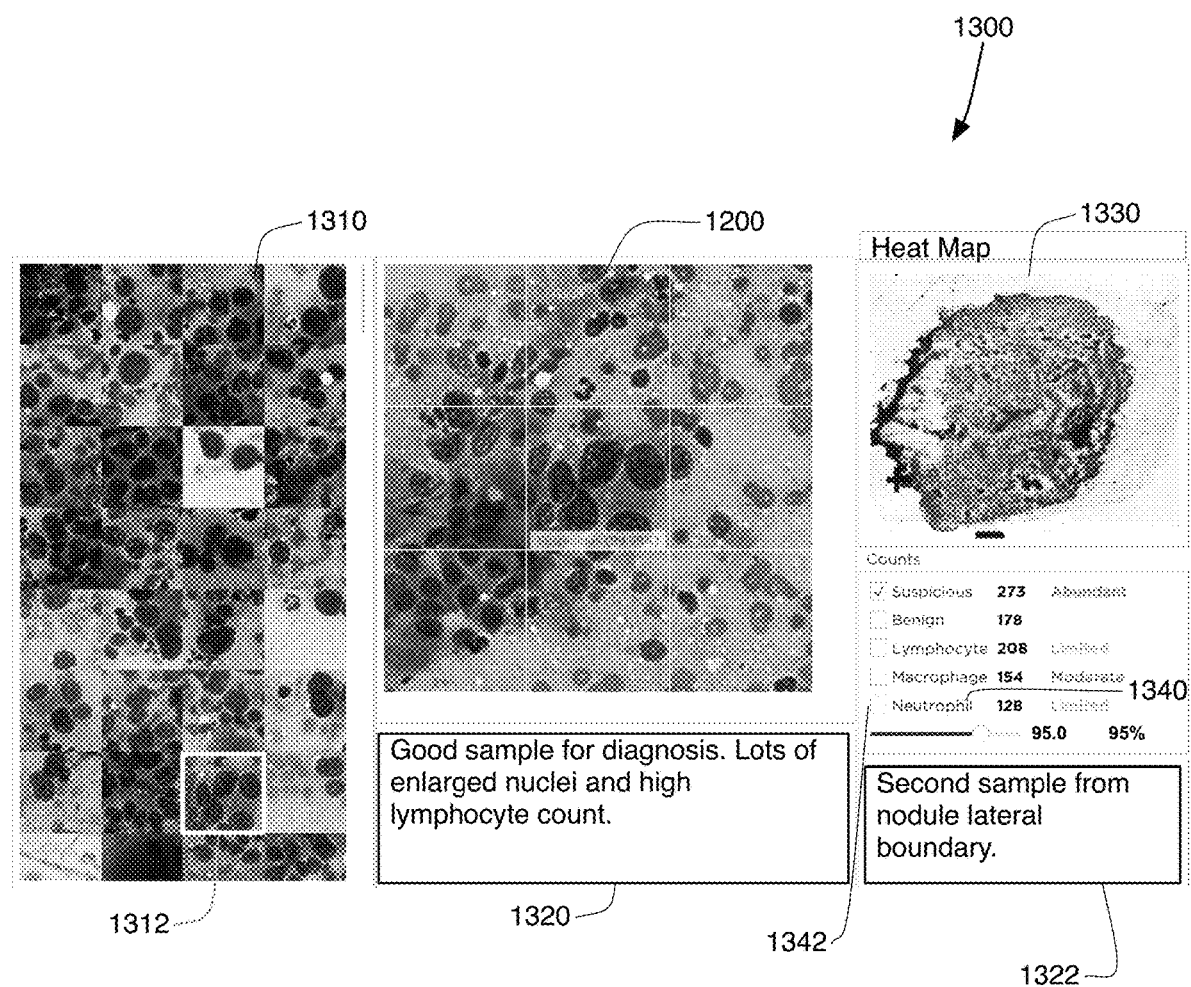
FIG. 13 is a user interface.

FIG. 13 presents a sample user interface 1300 for presentation of the tiles 720 at the remote computing device 140. This interface 1300 aids the cytopathologist in forming an opinion of the adequacy of the tissue sample. In this interface 1300, a plurality of tiles 1310 are presented for review by the remote cytopathologist. These presented tiles 1310 are those tiles classified and ordered by step 350. Some tiles 1310 can be presented through interface 1300 at step 360 of method 300 while other tiles are still being classified at step 350. The cytopathologist can select a tile 1312 for further review, which is then presented in the three-tyle by three-tile view in context 1200. In interface 1300, the view in context 1200 is shown adjacent to the presented tiles 1310. Notes 1320 concerning the slide and what is observed can be entered by the cytopathologist while viewing the selected tile 1312 in context. The interface 1300 may also allow for auxiliary notes 1322 concerning the slide, such as a description of the location where the biopsy sample shown on the slide was taken.

A heatmap overview 1330 of the slide is also shown in interface 1300, along with counts 1340 of the identified category labels assigned to the tiles 1310. The counting of suspicious or malignant regions can give an indication of sufficient material for molecular analysis. It is unreasonable for a cytopathologist to definitively count cells and determine the volume of cells, but with the CNNs 170 it is a rather simple task to provide such a metric. Other interesting counts such as the existence of lymphocytes can indicate the physician was sampling effectively within the lymph node. The total number of neutrophils detected on the slide can indicate the patient has a bacterial infection. The total number of macrophages detected on the slide can indicate the level of chronic inflammation for the patient. In the example of FIG. 1300, the whole slide image 200 may contain 360,000 total tiles, of which 208 tiles have already been identified as containing lymphocytes, with 154 contain macrophages and 273 contain suspicious or malignant cells.

In this example, fewer than 1 out of 1000 tiles throughout the WSI 200 have been identified as containing malignant cells. The cytopathologist can select to view only suspicious tiles (or some other category or categories) in interface area 1310 through selection boxes 1342.

Manually searching through the slide image 200 to find regions containing malignant cells is a tedious and error prone task for the cytopathologist. Directing the pathologist to tiles 1310 with the highest confidence of malignant cells, along with highlighting associated suspicious tiles on a heatmap 1330 and presenting overall tile counts 1340 for pathologies helps the pathologist determine the adequacy of the biopsy sample and whether it was obtained from the desired location (for example, from a lymph node).

In addition to allowing the cytopathologist to provide commentary 1320, 1322, the interface 1300 (or additional interfaces provided at the remote computing device 140) allow for the cytopathologist to provide feedback, make requests, and send conclusions back to the local biopsy location, thereby allowing quick interaction as part of the ROSE process. At step 365, the remote computing system 140 receives this interaction with the cytopathologist and records the cytopathologist conclusion as to the adequacy of the biopsy sample. Additional aspects of the remote interface 142 can be used to remotely control the robotic microscope 100 to view any location of interest, with new images being recorded and transmitted back to the remote computing device to give the cytopathologist additional information as required. The method then ends at step 325.

Steps 370 through 380 relate to an optional step of performing semantic segmentation on the scanned tiles 720 from step 345. Semantic segmentation is accomplished by using the CNN 550 trained specifically to do this task. This allows cell nuclei to be identified by size and shape in step 375, and for this information to be transmitted to the remote viewer using the remote computing system 140 at step 380. This provides information such as that shown in FIG. 11 while the cytologist is viewing the individual tiles 720. The results of this semantic segmentation can also be fed back into the classification process 350 utilizing CNNs 520 or 530. As explained above, this information can greatly aid the CNNs 520, 530 in their classification process.

Other steps are also optional. In particular, the use of non-site-specific data to train the cellular classification CNNs 520, 530 is optional. If non-site-specific data is not used in the training, step 330 can be skipped as this data will not be used in the analysis of steps 350 and 375. Other steps can also be removed without altering the basic character of the invention.

An evaluation of the results using method 300 for automated CNN-based classification scheme of malignant lung cells indicated sensitivity, specificity, and accuracy results of 98.0%, 96.4%, and 98.5%, respectively. These results are generally consistent with studies made of the diagnostic ability of pulmonary cytology by cytopathologists. In a 2004 publication ("Efficacy of Bronchial Wash Cytology and its Correlation with Biopsy in Lung Tumours," Journal of the Pakistan Medical Association, vol. 51, issue 1), a study of the accuracy of cytodiagnosis in 73 cases showed sensitivity, specificity, and accuracy of 80.5%, 96.6%, and 87.3%, respectively.

These results reveal that the proposed method 300 can effectively identify malignant cells in microscopic cytological images. These results are for individual patches on a slide with greater than 100,000 patches on each slide, leading to an accuracy rate of potentially 100% for slide identification. For slides that are Abundant, Moderate, or Sparse, it is extremely unlikely that factors that could affect accurate identification are present to such an extent that it would change result. It is only for the fringe cases that factors such as over staining or extraneous artifacts could affect the overall identification of the slide.

Aspects of the present disclosure are applicable to a variety of systems and approaches involving the utilization of artificial intelligence (e.g., machine learning, convolutional neural networks, etc.) to assist with assessment of pathological samples. Aspects of the techniques described herein are predominantly described in the context of a user interface being viewed remotely from a microscope via which images of a slide are obtained. While embodiments of the present disclosure are not necessarily limited to such contexts in which the user interface is displayed, viewed, and/or interacted with by a cytopathologist remotely from the microscope, an appreciation of some aspects of the novel concepts described herein may be best appreciated through a discussion of such contexts. However, scenarios in which the user interface is displayed via a display integrated into the microscope and/or physically located within the same room and or medical facility as the microscope are contemplated and within the scope of the claims below—unless clearly and unambiguously excluded via explicit claim limitations.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method comprising:
   a) generating a first slide image from a slide of a biopsy sample;
   b) accessing non-image data associated with the biopsy sample;
   c) accessing a first trained convolutional neural network (CNN) trained to identify areas of pathological interest;
   d) using the first trained CNN to identify the areas of pathological interest in the first slide image, wherein each area of pathological interest is associated with a first confidence level by the first trained CNN;
   e) generating a plurality of tiles comprising images of subregions of the slide by subdividing the first slide image into the plurality of tiles;
   f) for multiple areas of pathological interest:
      i) identifying selected tiles showing the area of pathological interest, and
      ii) associating the selected tiles with the first confidence level associated with the area of pathological interest;
   g) accessing a second trained CNN trained to categorize tiles into histological categories; and
   h) analyzing the selected tiles with the second trained CNN to assign each of the selected tiles one of the histological categories, wherein the selected tiles having a high first confidence level are analyzed before the selected tiles having a low first confidence level, wherein the non-image data is included as input into the second trained CNN for the selected tiles includes the non-image data.

2. The method of claim 1, wherein the tiles each comprise a plurality of layers of images taken at different focal depths, further wherein the step of analyzing the selected tiles with the second trained CNN further comprises using the plurality of layers as input into the second trained CNN.

3. The method of claim 1, wherein the non-image data is site-specific data extracted from a biopsy probe that collected the biopsy sample.

4. The method of claim 1, wherein the selected tiles are analyzed with the second trained CNN in a first sorted order based on the first confidence level.

5. The method of claim 4, further comprising:
   i) presenting the analyzed selected tiles through a remote user interface for an evaluation; and
   j) receiving the evaluation from the remote user interface.

6. The method of claim 5, wherein the tiles are transmitted to the remote user interface in a second sorted order based on the histological category assigned to the tiles.

7. The method of claim 6, wherein the second trained CNN associates the histological category assigned to the tiles with a second confidence level, further wherein the second sorted order is also based on the second confidence level.

8. The method of claim 6, further comprising analyzing additional tiles with the second trained CNN at a time a first tile is presented to the remote user interface.

9. The method of claim 1, further comprising accessing a third trained CNN trained to identify nuclei size and shape for semantic segmentation, and further comprising analyzing the selected tiles with the third trained CNN to perform semantic segmentation on the selected tiles.

10. The method of claim 9, wherein the step of analyzing the selected tiles with the second trained CNN further comprises using the semantic segmentation as input into the second trained CNN.

11. The method of claim 9, wherein the semantic segmentation is transmitted to a remote user interface along with the analyzed selected tiles.

12. The method of claim 9, further comprising accessing a fourth trained CNN trained to determine a usable quality of the slide based on the first slide image before using the first trained CNN.

13. A method comprising:
   a) selecting a first set of images of a first set of biopsy slides;
   b) identifying a first set of tiles from the first set of images, wherein each tile comprises a portion of one image;
   c) obtaining cytopathology analysis of the first set of tiles to determine true histological categories for the tiles in the first set of tiles;
   d) obtaining first set site characteristics for the first set of biopsy slides;
   e) using the first set of tiles, the determined true histological categories, and the first set site characteristics to train an intermediate convolutional neural network to assign histological categories to tiles;
   f) selecting a second set of images of a second set of biopsy slides;
   g) identifying a second set of tiles from the second set of images;
   h) obtaining second set site characteristics for each of the second set of biopsy slides;
   i) applying the intermediate convolutional neural network to assign histological categories to the second set of tiles;
   j) selecting a first subset of the second set of tiles assigned to a histological category of interest;
   k) obtaining cytopathology analysis of the first subset to determine true histological categories for the tiles in the first subset; and
   l) using the first subset, their determined true histological categories, and the second set site characteristics to train a revised convolutional neural network to assign histological categories to tiles.

14. The method of claim 13, further comprising using feedback to improve the revised convolutional neural network by:
   i) applying the revised convolutional neural network to assign histological categories to the second set tiles,
   ii) selecting a second subset of the second set tiles assigned to the histological category of interest, the second subset being different than the first subset,
   iii) obtaining cytopathology analysis of the second subset to determine true histological categories for the tiles in the second subset, and
   iv) using the second subset, their assigned true histological categories, and the second set site characteristics to retrain the revised convolutional neural network assignment of histological categories to tiles.

15. The method of claim 13, wherein each tile comprises a plurality of layers of images taken at different focal depths; further wherein the training of the intermediate convolutional neural network and the revised convolutional neural network utilizes the plurality of layers as input.

16. The method of claim 13, wherein the first set site characteristics and the second set site characteristics both comprise data selected from a set consisting of biopsy site tissue density and biopsy site oxygen levels.

17. The method of claim 13, further comprising using a third trained convolutional neural network to identify nuclei size and shape for semantic segmentation; and further wherein the training of the intermediate convolutional neural network and the revised convolutional neural network utilized the semantic segmentation as input.

18. A method comprising:
   a) accessing a first trained convolutional neural network (CNN) trained to identify areas of pathological interest;
   b) using the first trained CNN to identify the areas of pathological interest in a first slide image taken from a slide of a biopsy sample, wherein each area of pathological interest is associated with a first confidence level by the first trained CNN;
   c) generating a plurality of tiles comprising images of subregions of the slide;
   d) for multiple areas of pathological interest:
      i) identifying selected tiles showing the area of pathological interest, and
      ii) associating the selected tiles with the first confidence level associated with the area of pathological interest;
   e) accessing a second trained CNN trained to categorize tiles into histological categories; and
   f) analyzing the selected tiles with the second trained CNN to assign each of the selected tiles one of the histological categories, wherein the selected tiles having a high first confidence level are analyzed before the selected tiles having a low first confidence level.

19. The method of claim 18, wherein the tiles each comprise a plurality of layers of images taken at different focal depths, further wherein the step of analyzing the selected tiles with the second trained CNN further comprises using the plurality of layers as input into the second trained CNN.

20. The method of claim 18, wherein site-specific data for the biopsy sample is submitted as input into the second trained CNN.

* * * * *